(12) United States Patent
Dlouhy et al.

(10) Patent No.: US 10,072,795 B2
(45) Date of Patent: Sep. 11, 2018

(54) LUBRICANT DISTRIBUTOR

(71) Applicant: Otis Elevator Company, Farmington, CT (US)

(72) Inventors: Michal Dlouhy, Breclav (CZ); Zdenek Bazala, Breclav (CZ)

(73) Assignee: OTIS ELEVATOR COMPANY, Farmington, CT (US)

( * ) Notice: Subject to any disclaimer, the term of this patent is extended or adjusted under 35 U.S.C. 154(b) by 215 days.

(21) Appl. No.: 15/032,371

(22) PCT Filed: Oct. 29, 2013

(86) PCT No.: PCT/US2013/067251
§ 371 (c)(1),
(2) Date: Apr. 27, 2016

(87) PCT Pub. No.: WO2015/065334
PCT Pub. Date: May 7, 2015

(65) Prior Publication Data
US 2016/0273707 A1 Sep. 22, 2016

(51) Int. Cl.
*F16N 25/04* (2006.01)
*F16N 13/22* (2006.01)
(Continued)

(52) U.S. Cl.
CPC .............. *F16N 25/04* (2013.01); *B66B 31/00* (2013.01); *F16N 13/22* (2013.01); *F16N 23/00* (2013.01); *F16N 2210/24* (2013.01)

(58) Field of Classification Search
CPC .......... F16N 25/04; F16N 13/22; F16N 23/00; F16N 2210/24; F16N 7/39; B66B 31/00
See application file for complete search history.

(56) References Cited

U.S. PATENT DOCUMENTS

| 5,181,585 A | 6/1993 | Braun et al. |
| 5,289,899 A * | 3/1994 | King ...................... F16N 7/385 |
| | | 184/12 |

(Continued)

FOREIGN PATENT DOCUMENTS

| CN | 1064115 A | 9/1992 |
| CN | 2575410 Y | 9/2003 |

(Continued)

OTHER PUBLICATIONS

Chinese Office Action and Search Report for application CN 201380080642.0, dated May 12, 2017, 8pgs.

(Continued)

*Primary Examiner* — William E Dondero
*Assistant Examiner* — Robert T Reese
(74) *Attorney, Agent, or Firm* — Cantor Colburn LLP

(57) ABSTRACT

A lubricant distributor of a lubrication system configured to lubricate one or more components of a passenger conveyor is provided including a housing having an input opening, a plurality of output openings and a shaft opening. A valve stem including a bore and a plurality of lubricant outlets is generally arranged within the shaft opening. The bore is configured to fluid couple the input opening to each of the lubricant outlets. Each lubricant outlet is associated with and configured to provide lubricant to at least one of the plurality of output openings at a distinct position of the valve stem. The lubrication system may include multiple lubricant distributors connected by a lubrication fluid circuit having a pump, motor and lubricant source.

20 Claims, 5 Drawing Sheets

(51) Int. Cl.
    *B66B 31/00*     (2006.01)
    *F16N 23/00*     (2006.01)

(56) References Cited

U.S. PATENT DOCUMENTS

| | | | | |
|---|---|---|---|---|
| 8,544,610 | B2 * | 10/2013 | Paluncic | F16N 7/38 |
| | | | | 184/26 |
| 9,689,530 | B2 * | 6/2017 | Lehnert | F16N 11/08 |
| 2004/0129500 | A1 | 7/2004 | Weigand et al. | |
| 2012/0134847 | A1 | 5/2012 | Conley et al. | |
| 2012/0181114 | A1 | 7/2012 | Paluncic et al. | |
| 2013/0277147 | A1 | 10/2013 | Conley et al. | |

FOREIGN PATENT DOCUMENTS

| | | |
|---|---|---|
| CN | 2740874 Y | 11/2005 |
| CN | 201611000 U | 10/2010 |
| CN | 102537633 A | 7/2012 |
| JP | 2005067882 A | 3/2005 |
| JP | 2006226419 A | 8/2006 |
| KR | 20120110911 A | 10/2012 |

OTHER PUBLICATIONS

European Search Report for application EP 13896684.1, dated May 31, 2017, 7pgs.
International Search report of the International Application No. PCT/US2013/067251 dated Jul. 24, 2014, 5 pages.
Written Opinion for application PCT/US2013/067251 dated Jul. 24, 2014, 6 pages.
Chinese Second Office Action with Translation; Application No. 2013800806420; dated Nov. 30, 2017; pp. 1-30.
Jia-Sheng Chen, "Practical Technical Tutorials of Elevator," China Electric Power Press, May 2006, pp. 341-342, English Abstract Added.
PCT International Preliminary Report on Patentability; International Application No. PCT/US2013/067251; International Filing Date: Oct. 29, 2013; dated May 3, 2016; pp. 1-7.

* cited by examiner

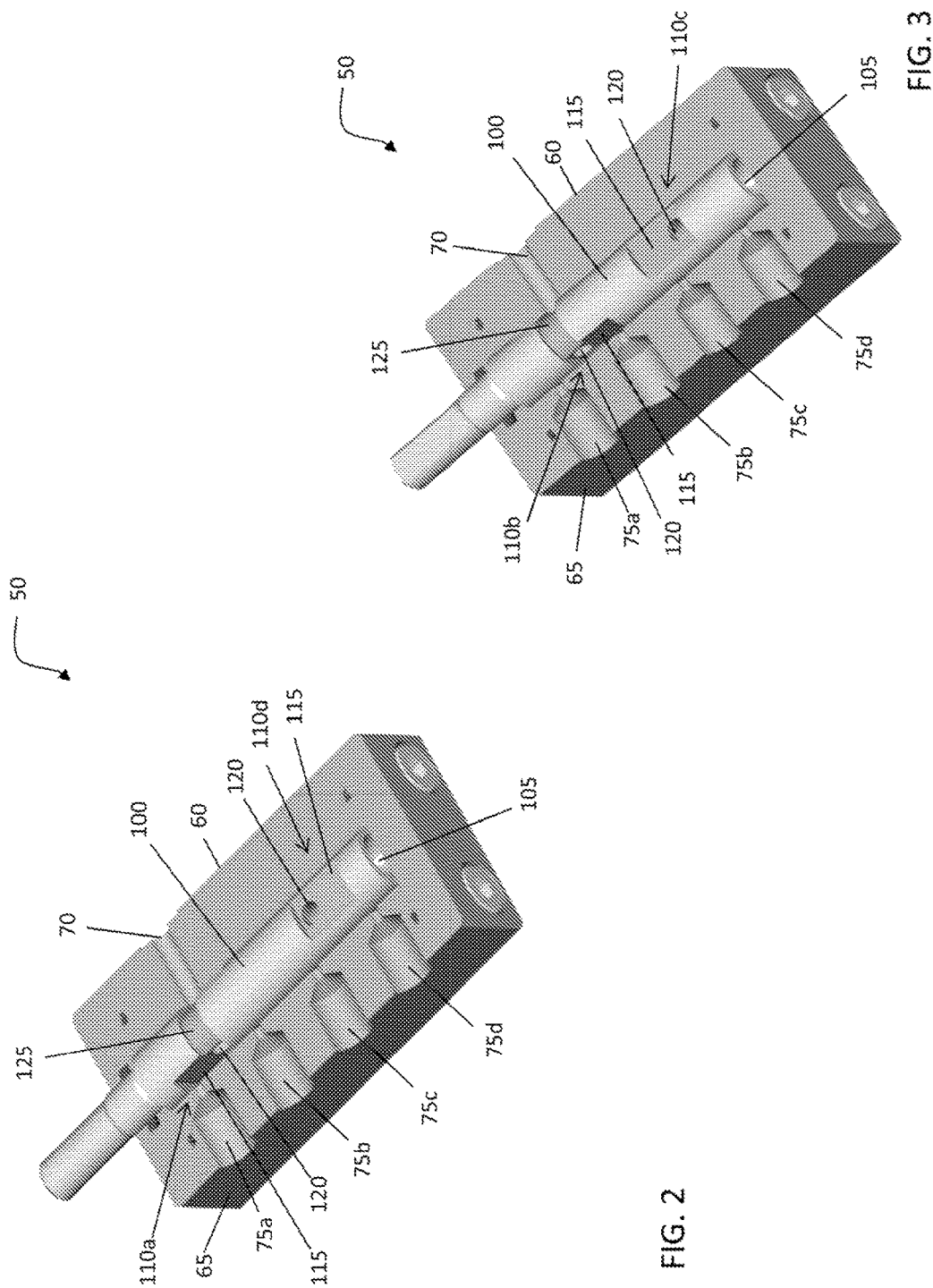

LUBRICANT DISTRIBUTOR

BACKGROUND OF THE INVENTION

Embodiments of the invention relate to escalators and moving walkways, and more particularly, to a distributor configured to lubricate a plurality of components of an escalator or moving walkway.

Lubrication devices are commonly used to prevent the increase of friction and the development of noise between moving components of an escalator or moving walkway. Friction and noise can result, for example between a moving step and a stationary frame, due to environmental contamination such as dust, dirt and debris, or from wear at the interface of the components over time.

An escalator includes a plurality of steps that are connected together by one or more circulating step chains forming an endless loop. The escalator steps are arranged to be able to be vertically offset relative to each other along certain portion of the endless loop to create a vertical rise. In contrast, a moving walk includes a plurality of pallets that are joined together by one or more circulating pallet chains for horizontal transportation. In both transport systems, handrails can be provided that are driven via handrail chains. Step chains, pallet chains, and handrail chains are typically coupled to one or more drive units by sheaves or sprockets driven by an electric motor. To reduce friction, noise, and power requirements, and to increase the service life of the transport system, the step, pallet, and handrail chains should be lubricated regularly. Additionally escalator and moving walk systems also include parts that require regular lubrication, such as bearings, other chains, ropes etc.

Conventional automatic lubrication systems generally include gravity fed systems, "oil mist" or injection spray systems, and continuous feed systems. Gravity driven systems are configured to supply lubricant intermittently in the form of droplets applied directly to the parts need lubrication. Injection spray systems spray or inject lubricant directly onto the part needing lubrication, and continuous feed systems deliver lubricant in the form of a stream to parts needing lubrication.

One common disadvantage of conventional automatic lubrication systems is that the systems are only configured to provide lubricant to a single component. The lubricant that is provided may be done so inefficiently such that a significant portion of expensive lubricant is wasted and may result the need to clean-up a potentially environmentally hazardous substance. In addition, the systems provide limited control over the flow or amount of lubricant being supplied to the component.

Therefore, a need exists for improved lubricant delivery systems for transport systems such as escalators and moving walks which can more efficiently deliver needed quantities of lubricant than currently available systems.

BRIEF DESCRIPTION OF THE INVENTION

According to one embodiment of the invention, a lubricant distributor of a lubrication system configured to lubricate one or more components of a device is provided including a housing having an input opening, a plurality of output openings and a shaft opening. A valve stem including a bore and a plurality of lubricant outlets is generally arranged within the shaft opening. The bore is configured to fluid couple the input opening to each of the lubricant outlets. Each lubricant outlet is associated with and configured to provide lubricant to at least one of the plurality of output openings at a distinct position of the valve stem.

Additionally or alternatively, the invention may incorporate one or more of the following features individually or in various combinations:

the valve stem is configured to rotate relative to the housing;

the valve stem is configured to move along an axis relative to the housing;

the plurality of lubricant outlets is spaced about a circumference of the valve stem;

the plurality of lubricant outlets is spaced about a length of the valve stem;

only a portion of the plurality of lubricant outlets is configured to provide lubricant to the plurality of output openings at a time;

at least one lubricant outlet exists for each of the plurality of output openings;

each of the plurality of lubricant outlets includes a recess formed in an outer diameter of the valve stem and a channel extending through the recess to the bore;

the lubricant distributor includes a pressure relief valve and an accumulator fluidly coupled to the distributor housing, with the pressure relief valve configured to control flow into the accumulator;

a first motor operably coupled to the valve stem and configured to move the valve stem relative to the housing;

a pump configured to supply lubricant from a lubricant source to the input opening;

a second motor operably coupled to the pump to drive the pump;

a first output opening is fluidly coupled to a first component of the passenger conveyor and a second output opening is fluidly coupled to a second component of the passenger conveyor; and/or the lubricant distributor is configured to provide lubricant to one or more components of a passenger conveyor.

According to another embodiment of the invention, a lubrication system is provided including a first lubricant distributor and a second lubricant distributor. The first lubricant distributor is configured to provide lubricant to a first component and the second lubricant distributor is configured to provide lubricant to a second component. A circuit fluidly couples a lubricant source to the first lubricant distributor and the second lubricant distributor. A reversible pump is arranged within the circuit and is configured to draw lubricant there through in either a first direction or a second direction. When the pump operates in a first direction, lubricant from the lubricant source flows through the circuit to the first lubricant distributor. When the pump operates in a second direction, lubricant form the lubricant source flows through the circuit to the second lubricant distributor.

Additionally or alternatively, the invention may incorporate one or more of the following features individually or in various combinations:

a first check valve arranged within the circuit to permit a flow of lubricant towards the second lubricant distributor;

a second check valve is arranged within the circuit to permit a flow of lubricant towards the first lubricant distributor;

a third check valve is arranged within the circuit configured to stop a back flow of lubricant from the first lubricant distributor;

a fourth check valve is arranged within the circuit to stop a back flow of lubricant from the second lubricant distributor; and/or a motor operably coupled to the reversible pump and configured to control a direction of operation of the pump.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

FIG. 2 is a perspective view of a valve stem of a lubricant distributor in a first position according to an embodiment of the invention;

FIG. 3 is a perspective view of a valve stem of a lubricant distributor in a second position according to an embodiment of the invention;

The detailed description explains embodiments of the invention, together with advantages and features, by way of example with reference to the drawings.

DETAILED DESCRIPTION OF THE INVENTION

Figure 1:
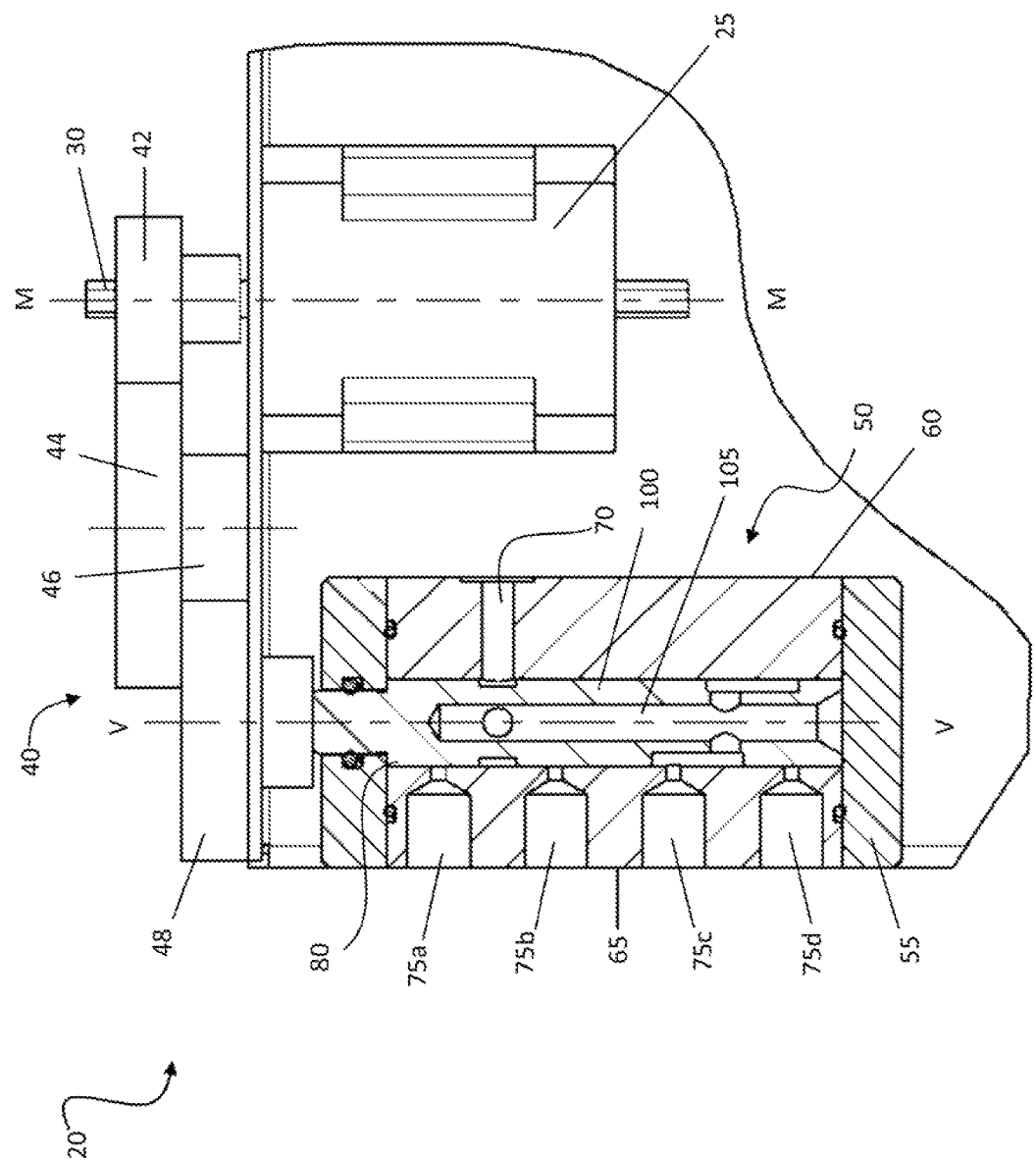
FIG. 1 is a cross-section of a lubricant distributor according to an embodiment of the invention.
Figure 5:
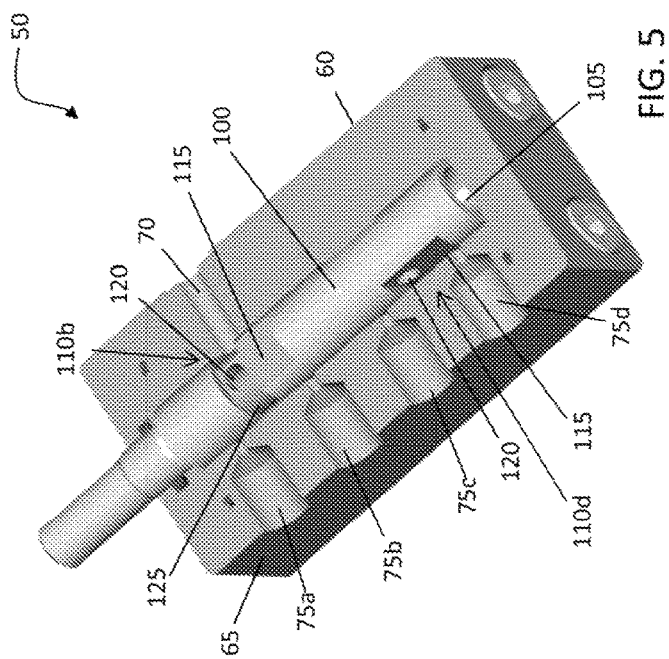
FIG. 5 is a perspective view of a valve stem of a lubricant distributor in a fourth position according to an embodiment of the invention.
Figure 4:
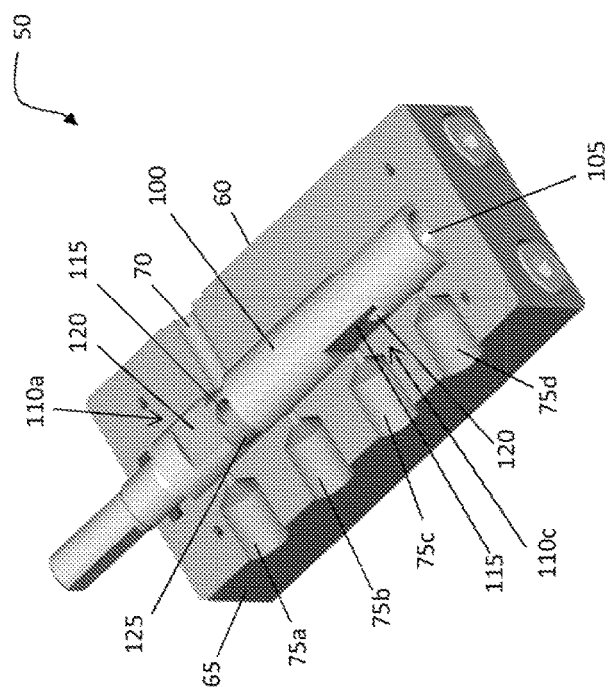
FIG. 4 is a perspective view of a valve stem of a lubricant distributor in a third position according to an embodiment of the invention.

Turning now to FIG. 1, a cross-section of a lubrication system 20, such as configured for use in an elevator or moving walk for example, is illustrated. The lubrication system 20 includes a motor 25, such as a stepper motor for example, having a shaft 30 configured to rotate about an axis M. The lubrication system 20 also includes a distributor 50 having a rectangular housing 55 with an input opening 70 and at least one output opening 75. The at least one output opening 75, may be positioned about one or more sides of the housing 55. The at least one output opening 75 may be positioned adjacent different sides of the housing 55 than the input opening 70, or alternatively, at least one of the output openings 75 may be disposed on the same side of the housing 55 as the input opening 70. In the illustrated, non-limiting embodiment, the distributor 50 includes an input opening 70 adjacent a first side 60 of the housing 55 and a plurality of substantially similar output openings 75 aligned about a second, opposite side 65 of the housing 55. The input opening 70 is configured to provide an input for a fluid lubricant into the distributor 50 and the output openings 75 are configured to provide the lubricant to one or more components, such as a step chain or handrail chain for example.

The housing 55 also includes a shaft opening 80 generally connected to the input opening 70 and the at least one output opening 75. In the illustrated, non-limiting embodiment, the shaft opening 80 extends longitudinally through the housing 55, in an orientation substantially perpendicular to the input and output openings 70, 75; however other orientations are within the scope of the invention.

Arranged within the shaft opening 80 is a valve stem 100. As shown in the figures, the valve stem 100 is configured to rotate about an axis V; however, other motions of the valve stem 100 within the housing 55 may be employed, such as longitudinal motion, with or without the rotational motion. In one embodiment, the axis V of the valve stem 100 and the axis M of the motor shaft 30 are substantially parallel. The motor shaft 30 and the valve stem 100 are directly or indirectly coupled, such that operation of the motor 25 applies a rotational force to the valve stem 100. In the illustrated, non-limiting embodiment the motor shaft 30 and valve stem 100 are coupled by a gear train 40. For example, the gear train 40 may include a first gear 42 mounted on the motor shaft 30, a second gear 44 mounted on an intermediary shaft (not shown) and configured to engage the first gear 42, a third gear 46 mounted on the intermediary shaft (not shown), and a fourth gear 48 mounted on the valve stem 100 and configured to engage the third gear 46. However, other gear train configurations and coupling devices are within the scope of the invention, as well as an embodiment having no gear or other transmission mechanism between the motor and the stem.

The valve stem 100 includes a centrally positioned bore 105 operably coupled to the input opening 70 in the housing 55. The valve stem 100 additionally includes a plurality of similar lubricant outlets 110 (best shown in FIGS. 2-5), each lubricant outlet 110 being configured to periodically provide lubricant to at least one output opening 75 in the housing 55. In the illustrated, non-limiting embodiment, the valve stem 100 includes four lubricant outlets 110a, 110b, 110c, 110d, one associated with each output opening 75; however, the valve stem 100 may include any number of lubricant outlets 110 and each lubricant outlet 110 may be configured to provide lubricant to any number of output openings 75. The plurality of lubricant outlets 110 are arranged at various positions about the length and circumference of the valve stem 100 such that only a portion of the lubricant outlets 110 and output openings 75 are fluidly coupled at any time. In one embodiment, each lubricant outlet 110 includes a shallow recess 115 extending generally axially along the valve stem 100 and a channel 120 extending through a portion of the recess 115 to the bore 105. The channel 120 is configured to provide a flow path for the fluid lubricant within the bore 105 to the recess 115, and ultimately to an output opening 75. Lubricant outlets 110 having other configurations, such as including a recess 115 extending partially about the circumference of the valve stem 100 for example, are within the scope of the invention.

The portion of the valve stem 100 directly adjacent the input opening 70 includes a groove 125 extending about the circumference of the valve stem 100. In addition, at least one hole is formed in the groove 125 so that the lubricant provided by the input opening 70 may flow into the bore 105 of the valve stem 100. In one embodiment, the at least one hole formed in the groove 125 is the channel 120 of one of the lubricant outlets 110, such as the first and second lubricant outlets 110a, 110b for example.

Referring now to FIGS. 2-5, the recess 115 of each lubricant outlet 110 is substantially aligned with a corresponding output opening 75 when the valve stem 100 is at a given position during its rotation. When the valve stem 100 is in any of these positions, lubricant from the bore 105 flows through a recess 115 of at least one of the lubricant outlets 110 to an adjacent output opening 75. The valve stem 100 is configured to provide lubricant to only a single output 75 at a time. Each rotation of the valve stem 100 includes a first position (FIG. 2) for providing lubricant to the first output opening 75a, a second position (FIG. 3) for providing lubricant to the second output opening 75b, a third position (FIG. 4) for providing lubricant to the third output opening 75c, and a fourth position (FIG. 5) for providing lubricant to the fourth output opening 75d. The first position, second position, third position, and fourth position, may, but need not be arranged generally sequentially as the valve stem 100 rotates.

The position of each lubricant opening 110 is determined based on the number of output openings 75 in the housing 55 and also the order in which lubricant is provided to each output opening. Because the illustrated valve stem is configured to provide lubricant to each of the four output openings 75 separately, the first and third lubricant opening 110a, 110c and the second and fourth lubricant opening 110b, 110d are generally separated by 180 degrees of rotation, respectively. However, the lubricant openings 110 may be separated by another angle, such as 90 degrees for example. In addition, in embodiments where the output openings 75 are disposed on opposing sides housing 55, such as sides 60, 65 for example, the same lubricant opening 110 may be configured to provide lubricant to more than one output opening 75.

The amount of lubricant provided to each output opening 75 during the rotation of the valve stem 100 is determined in part by the rotational speed of the valve stem 100 and also by the size of the lubricant opening 110 and the output opening 75. To provide additional lubricant to an output opening 75, the valve stem 100 may include a plurality of lubricant outlets 110 configured to substantially align with a single outlet opening 75 at various positions about the rotation of the valve stem 100. Similarly, to provide additional lubricant to a component, multiple output openings 75 could be fluid coupled thereto. Other non-illustrated configurations of the lubricant distributor 50, such as having fewer or more output openings 75, or a slidable valve stem 100 for example, are within the scope of the invention.

Figure 7:
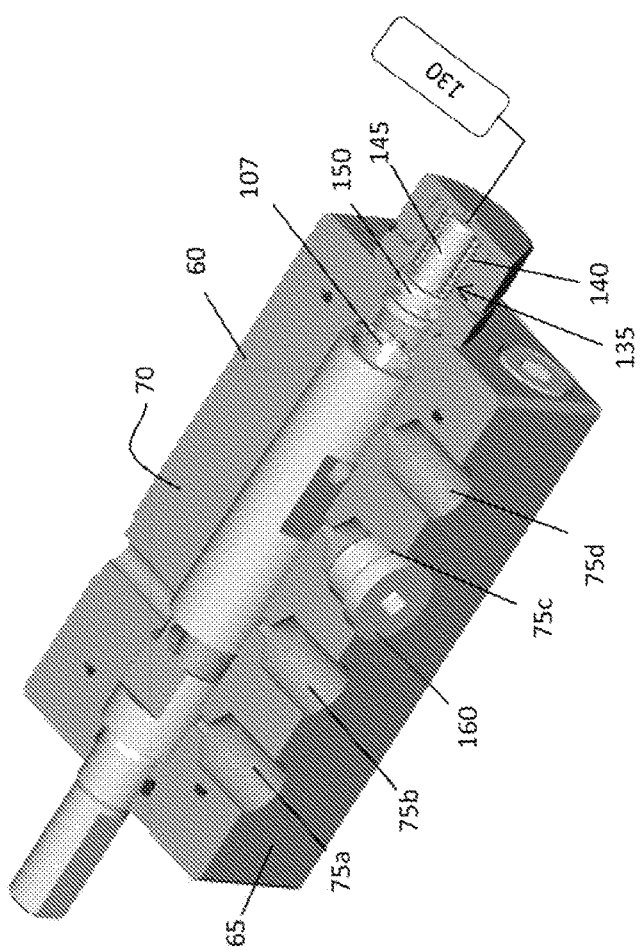
FIG. 7 is a perspective view of a portion of the lubricant distributor according to an embodiment of the invention.
Figure 6:
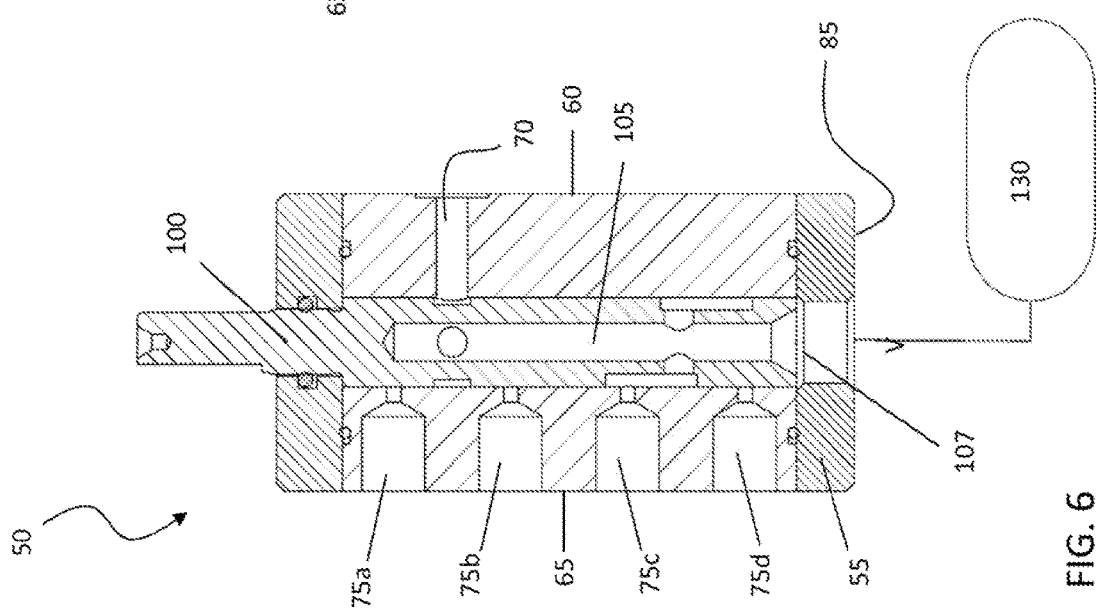
FIG. 6 is a cross-section of a portion of a lubricant distributor according to an embodiment of the invention.

Referring now to FIGS. 6 and 7, the distributor 50 may also include an accumulator 130 fluidly coupled to an end 85 of the distributor housing 55. In one embodiment, the accumulator 130 is configured to return the lubricant accumulated therein to a source 205 (see FIG. 8), such as a reservoir for example, connected to the input opening 70. A pressure relief valve 135 (FIG. 7) is arranged at the open end 107 of the bore 105 of the valve stem 100 to limit the flow of lubricant through the open end 107 of the bore 105. The pressure relief valve 135 is movable between a first position, partially inserted into the bore 105 of the valve stem 100, and a second retracted position, axially separated from the bore 105 of the valve stem 100 by a distance. A biasing mechanism 140 is arranged concentrically about the shaft 145 of the pressure relief valve 135 and is configured to apply a force to a flange 150 thereof, to bias the pressure relief valve 135 to the first position.

As illustrated in FIG. 7, a stopper 160 may be inserted into one or more of the output openings 75, for example if an outlet opening 75 is not connected to a component. This arrangement provides flexibility and permits the same distributor 50 to be used for various arrangements having different components requiring lubrication or for the modification of the product after installation. As the valve stem 100 reaches a position in its rotation where a lubricant outlet 110 and the stopped output opening 75 are generally aligned, the flow path for the lubricant from the bore 105 to the outlet opening 75 is blocked. The excess of lubricant remaining in the bore 105 may be released at the next position when another of the outlet openings 75 and lubricant outlets 110 are aligned. However, if the pressure resulting from lubricant buildup in the bore 105 exceeds a threshold, the pressure, as applied to the flange 150 of the pressure relief valve 135, will cause the biasing mechanism 140 to compress and the pressure relief valve 135 to move to the second position. When the pressure relief valve 135 is in the second position, lubricant is allowed to flow through the bore 105 to the fluidly coupled accumulator 130. Once the lubricant pressure has reduced to less than the biasing force of the biasing mechanism 140, the biasing mechanism 140 will bias the pressure relief valve 135 back to the first position.

Figure 8:
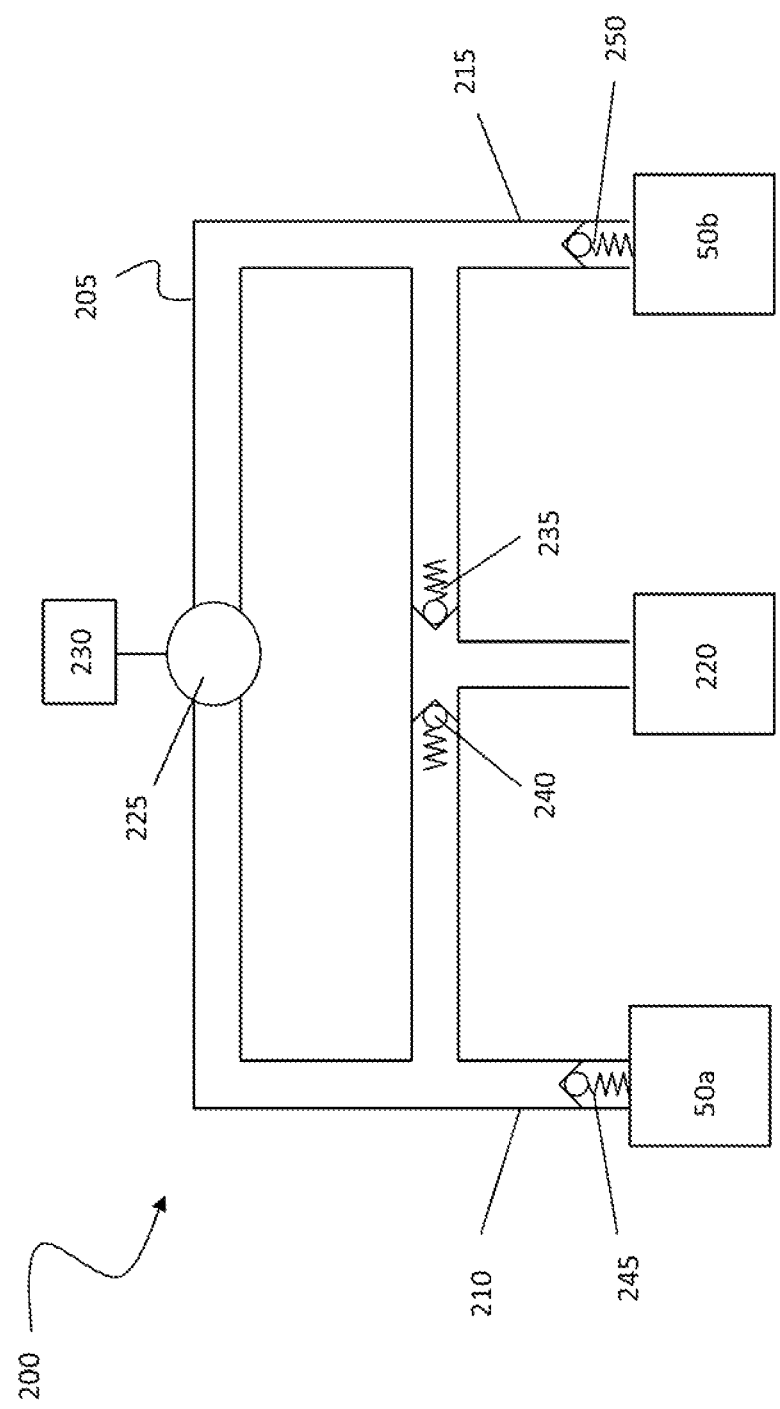
FIG. 8 is a circuit diagram of a flow of lubricant to the lubricant distributors according to an embodiment of the invention.

The lubrication system 20 may include more than one lubricant distributor 50. In such embodiments, the valve stems 100 of the plurality of distributors 50 may be coupled such that the valve stems 50 are driven by a single motor 25 or may be independently driven. Referring now to FIG. 8, a mechanical circuit 200 for a lubrication system 20 having a first lubricant distributor 50a and a second lubricant distributor 50b is illustrated. In one embodiment, the first lubricant distributor 50a is configured to provide lubricant to at least a first component, and the second lubricant distributor is configured to provide lubricant to at least a second component. The circuit 200 includes a conduit 205 having a first channel 210 connected to the first lubricant distributor 50a and a second channel 215 connected to the second lubricant distributor 50b. A lubricant source 220 is fluidly coupled to the conduit 205 and a reversible pump 225 is configured to draw lubricant from the lubricant source 220 through the conduit 205 in either a first direction or a second direction. A motor 230 is operably coupled to the pump 225. The motor 230 may be distinct from or the same motor as operably coupled to the first and second lubricant distributors 50a, 50b. The direction of operation of the motor 230 determines the direction of lubricant flow through the pump 225, and therefore the circuit 200.

Arranged at the interface between the lubricant source 220 and the conduit 205 are a first check valve 235 and a second check valve 240. Each check valve 235, 240 is configured to allow a flow of lubricant there through in a first direction, but not a second, opposite direction. In one embodiment, the first check valve 235 allows lubricant to flow from the lubricant source 220 to a first inlet of the pump 225 and the second check valve 240 allows lubricant to flow from the lubricant source 220 to a second inlet of the pump 225. Additionally, a third check valve 245 and a fourth check valve 250 are positioned within the first channel 210 and the second channel 215, respectively. The third and fourth check valves 245, 250 are configured to prevent back flow from each of the adjacent lubricant distributors 50a, 50b.

The direction of operation of the motor 25 may be used to control which lubricant distributor 50 is provided with lubricant. When the motor 230 operates in a first direction, the pump 225 is configured to draw lubricant through the pump 225 in a first direction. As a result of the draw of the pump 225, lubricant from the lubricant source 220 is drawn into the conduit 205, through the first check valve 235, and into the pump 225. The lubricant exiting the pump 220 is prevented from flowing back towards the lubricant source 220 by the second check valve 240, and as a result is directed into the first channel 210 to the first lubricant distributor 50a.

When the motor 230 operates in a second, opposite direction, the draw of the pump 225 is reversed such that lubricant from the lubricant source 220 is drawn into the conduit 205, through the second check valve 240 and into the pump 225. The flow of lubricant exiting the pump 225 is blocked from travelling towards the lubricant source by the first check valve 235. As a result, the lubricant flows into the second channel 215 and to the second lubricant distributor 50b. Although the first lubricant distributor 50a and second lubricant distributor 50b are illustrated and described as separate components, a single lubricant distributor 50 having a single valve stem and multiple input openings 70 is within the scope of the invention.

The lubricant system 20 provides precise lubricant distribution to one or more components. The overall number of lubricant systems 20 required for the various components of an escalator or moving walk (not shown) and the amount of lubricant required for each system is minimized, resulting in a cost reduction. In addition, the lubricant system 20 is easy to install and maintain and prevents damage to the pump 240 as a result of overpressure. Although described as particularly beneficial to an escalator or moving walk, it should be noted that the lubricant system 20 is equally applicable to other devices having multiple components requiring lubrication.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A lubricant distributor of a lubrication system configured to lubricate a plurality of components of a device, comprising:
   a housing including an input opening, a plurality of output openings, and a shaft opening, wherein each of the output openings is associated with one or more components; and
   a valve stem arranged within the shaft opening, the valve stem including a bore and a plurality of lubricant outlets, each of the plurality of lubricant outlets includes a recess formed in an outer diameter of the valve stem and a channel extending through the recess to the bore, the bore is configured to fluidly couple the input opening to each of the lubricant outlets, each lubricant outlet is associated with and configured to provide lubricant to at least one of the plurality of output openings at a distinct position of the valve stem.

2. The lubricant distributor according to claim 1, wherein the valve stem is configured to rotate relative to the housing.

3. The lubricant distributor according to claim 1, wherein the valve stem is configured to move along an axis relative to the housing.

4. The lubricant distributor according to claim 1, wherein the plurality of lubricant outlets are spaced about a circumference of the valve stem.

5. The lubricant distributor according to claim 1, wherein the plurality of lubricant outlets are spaced about length of the valve stem.

6. The lubricant distributor according to claim 1, wherein only a portion of the plurality of lubricant outlets is configured to provide lubricant to the plurality of output openings at a time.

7. The lubricant distributor according to claim 1, wherein there is at least one lubricant outlet for each of the plurality of output openings.

8. The lubricant distributor according to claim 1, wherein at least one of the lubricant outlets is associated with more than one output opening.

9. The lubricant distributor according to claim 1, further comprising
   an accumulator fluidly coupled to the distributor housing; and
   a pressure relief valve configured to control flow from the distributor housing to the accumulator.

10. The lubricant distributor according to claim 1, further comprising a first motor operably coupled to the valve stem, the first motor being configured to move the valve stem relative to the housing.

11. The lubricant distributor according to claim 1, further comprising a pump, the pump being configured to supply lubricant from a lubricant source to the input opening.

12. The lubricant distributor according to claim 11, further comprising a second motor operably coupled to the pump and configured to control a direction of lubricant flow through the pump.

13. The lubricant distributor according to claim 1, wherein a first output opening is fluidly connected to a first component of the device and a second output opening is fluidly coupled to a second component of the device.

14. The lubricant distributor according to claim 1, wherein the lubricant distributor is configured to provide lubricant to one or more components of a passenger conveyor.

15. A lubrication system comprising:
   a first lubricant distributor configured to provide lubricant to a first component;
   a second lubricant distributor configured to provide lubricant to a second component;
   a lubricant source;
   a circuit fluidly coupling the lubricant source to the first lubricant distributor and the second lubricant distributor;
   a reversible pump arranged within the circuit and configured to draw lubricant there through in either a first direction or a second direction, wherein when the pump operates in a first direction, lubricant from the lubricant source flow through the circuit to the first lubricant distributor and when the pump operates in a second direction, lubricant from the lubricant source flow through the circuit to the second lubricant distributor.

16. The lubrication system according to claim 15, further comprising a first check valve arranged within the circuit, wherein when the pump operates in the second direction, the first check valve is configured to permit a flow of lubricant towards the second lubricant distributor.

17. The lubrication system according to claim 16, further comprising a second check valve arranged within the circuit, wherein when the pump operates in the first direction, the second check valve is configured to permit a flow of lubricant towards the first lubricant distributor.

18. The lubrication system according to claim 17, further comprising a third check valve arranged within the circuit, the third check valve being configured to stop back flow of lubricant from the first lubricant distributor.

19. The lubrication system according to claim 18, further comprising a fourth check valve arranged within the circuit, the fourth check valve being configured to stop back flow of lubricant from the second lubricant distributor.

20. The lubrication system according to claim 15, further comprising a motor operably coupled to the reversible pump, the motor being configured to control the direction of operation of the pump.

\* \* \* \* \*